United States Patent [19]

Aatinen

[11] 4,084,302
[45] Apr. 18, 1978

[54] METHOD OF MANUFACTURING, FOR A PAPER MACHINE OR THE LIKE, A ROLL HAVING A GROOVED EXTERIOR SURFACE

[75] Inventor: Eino Aatinen, Jyvaskyla, Finland

[73] Assignee: Valmet Oy, Finland

[21] Appl. No.: 620,229

[22] Filed: Oct. 6, 1975

[30] Foreign Application Priority Data

Oct. 9, 1974 Finland .............................. 2944/74

[51] Int. Cl.² .............................................. B21K 1/02
[52] U.S. Cl. ............................... 29/148.4 D; 29/121.4
[58] Field of Search ....................... 29/148.4 D, 121.4

[56] References Cited

U.S. PATENT DOCUMENTS

| | | | |
|---|---|---|---|
| 1,315,978 | 9/1919 | McQueston | 144/230 |
| 3,633,259 | 1/1972 | Nikanen | 29/148.4 D |
| 3,718,959 | 3/1973 | Sailas | 29/121 H |

Primary Examiner—C.W. Lanham
Assistant Examiner—V. Rising

Attorney, Agent, or Firm—Steinberg & Blake

[57] ABSTRACT

A method of manufacturing, for a paper machine or the like, a roll which has a grooved exterior surface. An elongated strip is wound onto the exterior cylindrical surface of an inner roll body, this strip being initially straight and being curved when wound onto the inner roll body so as to conform to the curvature of the exterior surface thereof while successive turns of the strip engage each other, this strip having an inner edge region engaging the exterior surface of the inner roll body and an outer edge region distant from the inner roll body and having a thickness less than the thickness of the remainder of the strip so that the turns of the strip define between themselves at the outer edge region of the strip an elongated helical groove. While the strip is wound onto the inner roll body, a longitudinal portion of the strip which is spaced outwardly from the exterior surface of the inner roll body is elongated for facilitating the curving of the strip as it is wound onto the inner roll body.

8 Claims, 2 Drawing Figures

METHOD OF MANUFACTURING, FOR A PAPER MACHINE OR THE LIKE, A ROLL HAVING A GROOVED EXTERIOR SURFACE

BACKGROUND OF THE INVENTION

The present invention relates to a manufacturing method for providing a roll, of the type used in a paper machine, with an exterior grooved surface, so that such a roll can be used with advantage in connection with dewatering operations carried out in a paper machine in a well known manner.

In particular, the present invention relates to a method according to which an elongated strip of suitable cross-sectional configuration is wound onto the exterior cylindrical surface of an inner roll body in such a way that the successive turns of the wound strip, which is initially straight, engage each other. The cross-sectional configuration of the strip is such that an outer edge region of the strip which is distant from the inner roll body has a thickness less than the thickness of the remainder of the strip. As a result the successive turns define between themselves at the outer edge region of the wound strip an elongated helical groove which provides the exterior grooved surface for the roll.

Manufacture of paper machine rolls with grooved exterior surfaces by winding onto the roll a steel strip or the like is already known. In this connection reference may be made to U.S. Pat. No. 3,718,959.

In order to manufacture rolls with exterior grooved surfaces, it has been customary to mount an inner roll body which has an exterior cylindrical surface on a machine similar to a lathe in such a way that this inner roll body can be driven in rotation about its axis. The carriage of the machine which is movable in a direction parallel to the axis about which the inner roll body is turned carries a structure which guides a strip to the outer surface of the rotating inner roll body as the latter rotates to pull the strip onto the roll body, this strip being previously provided with a suitable profile. Before the winding of the strip onto the exterior surface of the inner roll body is started, one end of the strip is fixed, as, for example, by welding, to a ring which is fixed to one end of the inner roll body.

In order that the strip will be wound on the roll body in such a way that it will provide a faultless covering of the inner roll body without any tendency to unwind therefrom, the successive turns of the strip must be placed tightly in engagement with the exterior surface of the roll body while each turn is urged intimately into engagement with the immediately preceding turn of the strip. However, it has been found from experience that when operations of this type are performed a serious drawback is encountered in that during winding of the strip in order to cover the inner roll body and particularly when the strip is tightened, or in other words tensioned, the outer edge region of the strip which is distant from the inner roll body tends to tilt away from the previously formed turns in a manner providing an undesirable space between each turn and the immediately preceding turn. This tendency of the strip to tilt away from a previously formed turn during the winding of the strip onto the inner roll body is enhanced by the fact that as a rule the cross-sectional configuration of the strip is such that the distance between the inner and outer edges of the strip, or in other words the radial dimension of the wound strip with respect to the axis of the inner roll body is considerably greater than the thickness of the strip in the axial direction of the inner roll body. For example, strips of the above type customarily will have a thickness on the order of 3 mm while the distance between the inner and outer edges of the strip, or in other words the above radial dimension thereof, is on the order of 12 mm. Of course, it is clear that the ultimate underlying reason for the tendency of the strip to tilt or tip in this way is that the strip is originally straight, but when applied to the cylindrical surface of the inner roll body must assume a curvature as required by the radius of the roll body, and this curving or bending of the strip to conform to the curvature of the inner roll body spreads outwardly from the inner toward the outer edge of the strip radially with respect to the axis of the inner roll body and in the direction of the longer dimension of the cross-sectional configuration of the strip. Of course, the result is that while some slight compression of the strip may take place along the inner edge region thereof which directly engages the exterior surface of the inner roll body, the outer edge region of the strip which is distant from this roll body must become elongated to a considerable degree during curving of the strip, and as a reaction to this latter tendency the strip tilts or tips in the manner described above in such a way that a turn of the strip which is being applied to the inner roll body tilts away from the previously formed turns.

SUMMARY OF THE INVENTION

It is accordingly a primary object of the present invention to provide a method for manufacturing grooved rolls of the above type in such a way that the tendency of the strip to tilt away from previously wound turns thereof is reliably prevented.

Thus, it is an object of the present invention to provide a method according to which as the strip is wound onto the inner roll body, each turn of the strip will reliably engage the immediately preceding turn.

In particular, it is an object of the present invention to treat a strip in such a way that during the winding of the strip onto the inner roll body the curving of the strip so as to conform to the curvature of the surface of the roll body to be engaged by the strip will be enhanced.

However, in addition, it is an object of the invention to provide a treatment which will also cause each turn of the strip to tend to tilt toward the previously wound turn of the strip so that as each turn of the strip engages the exterior surface of the inner roll body, each turn will inherently tend to press against the immediately preceding turn.

It is furthermore an object of the present invention to provide a method which will achieve the above objects while at the same time enabling a strip which is initially straight to be continuously wound onto the exterior surface of an inner roll body so that in one continuous operation the inner roll body can be covered with the strip wound thereon.

According to the invention a longitudinal portion of the strip which is spaced outwardly beyond the inner roll body is elongated during the winding of the strip onto the inner roll body so that this elongation of the latter longitudinal portion will induce in the strip a curvature which will enhance the engagement between the strip and the exterior surface of the inner roll body. This elongation of the above longitudinal portion of a strip is brought about by pressing against an outer side surface region of the strip as it is wound onto the inner roll body with a considerable force which is great enough to provide the above elongation, this pressure being brought about by one or more rollers or the like to achieve the deformation and elongation of the strip which is suitably profiled so as to provide a grooved exterior surface at the finished roll. Simultaneously with the travel of the initially straight strip toward the roll body, which is turned to wind the strip thereof, the strip is braked so as to be under tension.

Thus, inasmuch as according to the invention a longitudinal portion of the strip spaced from the inner roll body is somewhat elongated during winding of the strip onto the inner roll body, the profiled strip more readily bends and curves to conform to the curvature required by the exterior cylindrical surface of the inner roll body. Inasmuch as, furthermore, the strip is elongated to a greater extent at its outer side surface region than at an inner side surface region thereof which engages the immediately preceding turn, the strip will tend to tilt or bend toward the immediately preceding turn of the strip which is already wound onto the inner roll body, so that the undesirable and harmful tendency of the strip to tip in an opposite direction is reduced to an even greater degree.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
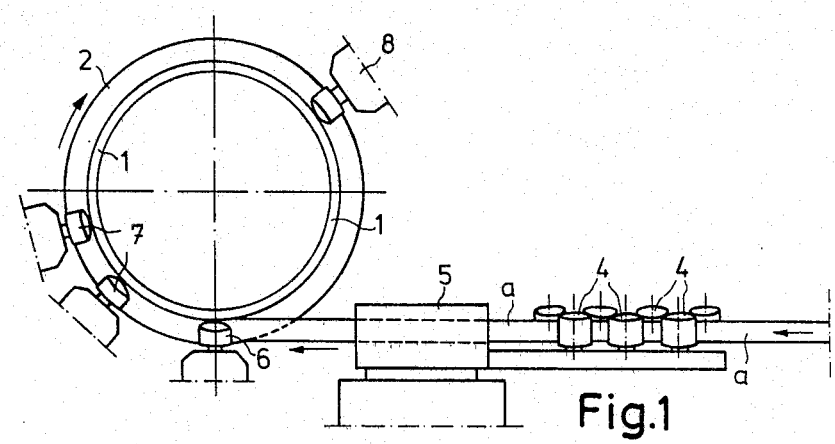
FIG. 1 is a schematic side elevation of a method of the invention.

Referring now to FIG. 1, there is schematically illustrated therein an inner roll body 1 made of any suitable metal, for example, and rotated around its axis, which is normal to the plane of FIG. 1, during winding onto the exterior surface of the inner roll body 1 of a covering formed by a suitably profiled strip a. Thus, the roll body 1 will have journal pins mounted on a machine such as a lathe, and thus such a machine may be used to rotate the roll body 1 around its axis, the roll body 1 rotating in a clockwise direction, as viewed in FIG. 1, during winding of the strip a onto the roll body 1. The lathe or equivalent machine has a carriage which is capable of being moved in a manner well known in the art in a direction parallel to the axis of the roll body 1. This feed movement of the carriage takes place of course while the roll body is rotated and in suitable synchronism with the rotation of the roll body so that the strip a will be properly fed to the roll body 1 during the rotation thereof. The carriage of the lathe carries structure which serves to guide the strip a to the rotating inner roll body 1, this structure which is carried by the carriage of the lathe or the like being provided with means for straightening the strip as well as for braking or retarding the movement of the strip toward the rotating roll body 1 so as to provide a given tension in the strip, suitable means being also provided for deforming and bracing the strip. Thus, FIG. 1 shows the straightening rollers 4 which in themselves are well known, these rollers 4 straightening the strip a as the strip a advances to the left, as viewed in FIG. 1, in response to the clockwise rotation of the inner roll body 1. After passing through the straightening rollers 4, the strip passes through the braking means 5, which provides a given frictional retarding force on the strip so as to retard the movement thereof toward the rotating roll 1, so as to provide a given tension in the strip a. For example, the braking means 5 may be in the form of a suitable channel which receives the strip a and through which the strip a travels, this channel being covered by a movable plate which by suitable screws can be adjusted so as to press with a given force against the strip a so as to provide the required braking force.

As the strip a travels to the left beyond the braking means 5, it is engaged by a first guide roller 6 at the point where the strip a extends tangentially at its inner edge region from the exterior cylindrical surface of the inner roll body 1 in a horizontal direction as indicated in FIG. 1. Thus, at the location of the first guide roller 6 the strip a will start to bend so as to conform to the curvature of and lie against the exterior surface of the roll body 1.

After the strip travels beyond the guide roller 6, supported for free rotation on any suitable pin which extends radially with respect to the axis of the roll 1, as is apparent from FIG. 1, pressure is exerted against an outer side surface region of the strip at a location spaced radially beyond the exterior surface of the roll body 1, this pressure acting in a direction which urges the turn which at any given instant is being wound onto the roll body 1 against the immediately preceding turn which has just been provided on the roll body 1. Thus, this pressure acts only on a part of the total radial width of the strip extending between its inner edge region which engages the exterior surface of the body 1 and its outer edge region which is distant from the roll body 1. This pressure is applied with a major force so that the outer longitudinal portion of the profiled strip will undergo a longitudinal elongation and will be deformed. In this way the profiled strip a readily accepts the curvature of the exterior surface of the roll body 1, this curvature being required by the particular radius of the roll body 1, and thus the strip a as a result of this elongation thereof at an outer longitudinal portion spaced from the exterior surface of the body 1 will settle itself very readily against the exterior surface of the roll body 1.

Figure 2:
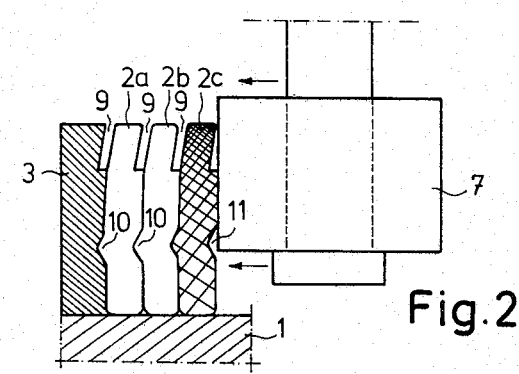
FIG. 2 is a fragmentary partly sectional illustration, taken in a plane which contains the axis of the roll, showing a partly wound strip on an inner roll body with a deforming roller engaging the strip during the winding thereof onto the inner roll body.

It is thus to be understood that the elongation of the strip a is provided only at an outer longitudinal region thereof spaced from the exterior surface of the body 1 and in the particular example illustrated the elongation is achieved by way of one or more deforming rollers 7 which only contact an outer side surface region of the profiled strip a, as is apparent from FIG. 2. Thus, the particular part of the strip which is engaged by the deforming rollers 7 is indicated with hatching in FIG. 2.

Thus, as is indicated in FIG. 2, the illustrated deforming roller 7 is supported for rotary movement on a pin which extends radially with respect to the axis of the inner roll body 1, and this roller 7 is urged toward the left, as viewed in FIG. 2, with a force large enough to compress the turn 2c which is applied against the previously completed turn 2b, with a force sufficient to elongate the longitudinal portion of the strip which is engaged by the roller 7 in the manner illustrated in FIG. 2. This elongation will result in a lengthening of the outer portion of the strip which is spaced from the body 1 in such a way as to enhance the curving of the strip required to cause the strip to lie in the best possible manner at its inner edge region against the exterior surface of the body 1. In addition, because each turn is engaged at its outer exposed side surface region it becomes elongated to a greater extent at this outer exposed side surface region than at its inner side surface region which presses against the previously completed turn, so that as a result of this action the strip tends to tip toward and thus will press against the immediately preceding turn, so as to completely avoid any possibility of tipping of the turn of the strip in the opposite direction away from the immediately preceding turn. Thus, the profiled strip *a* will bend slightly toward the already completed turns, thus contributing to the elimination of the risk of tipping in an undesirable manner.

FIG. 1 illustrates subsequent to the first guide roller 6 a pair of deforming rollers 7, but it is to be understood that any desired number, such as one or more rollers 7 may be provided as required.

The deforming rollers are acted upon by unillustrated hydraulic power means which serve to urge the rollers 7 against the outer side surface region of the strip in a direction which urges the particular turn which at any instant is wound onto the roll 1 toward the previously formed turns. Thus, for example, suitable hydraulic cylinders which are mounted against any suitable robust stationary structure can have a hydraulic liquid supplied thereto at a suitable pressure, these cylinders having their axes extending parallel to the axis of the roll 1 and the cylinders carry pistons whose piston rods extend outwardly of the cylinders and are provided with transverse bores which receive the pins which carry the rollers 7, so that in this way the rollers 7 can be mounted in the manner illustrated for rotation about axes which extend radially with respect to the axis of the roll 1. The hydraulic fluid under pressure is fed to the cylinders so as to urge the pistons and the pins together with the rollers 7 toward the turn such as the turn 2c of FIG. 2 in the direction of the arrows toward the left, as viewed in FIG. 2, and through a suitable valve similar to a known safety valve the pressure of the fluid in each cylinder can be maintained at a selected value while the fluid escapes from each cylinder as the piston moves into the latter during the continuous winding of the strip onto the body 1.

Thus it is possible in accordance with the method of the invention to urge the strip to the left in a direction parallel to the axis of the roll body 1, as viewed in FIG. 2, with a force which preferably is on the order of 400 - 450 kp.

FIG. 1 also illustrates a guide roller 8 which is utilized in order to insure that the previously completed covering of the roll body 1 will not loosen in the axial direction thereof.

The brake means 5 retard the travel of the profiled strip *a* toward the roll body 1 with a force of about 300 - 400 kp, this latter force having been found to produce an appropriate tension in the profiled strip *a* with a view to properly tightening the strip on the body 1 so as to provide a proper covering 2 for the body 1.

The above braking force will provide a tensile stress on the order of 10 kp/mm$^2$, if the cross section of the strip has dimensions as set forth above, namely 3 × 12 mm, and if the tensile stress is assumed to be uniformly distributed over the cross-sectional area of the strip. The brake means 5 preferably includes devices for adjusting the braking force, as set forth above so as to control the braking force, as well as a suitable device for measuring and indicating the braking force which is provided.

As has been indicated above, the starting end of the strip is fixed to the inner body 1 as by being welded thereto. Thus, FIG. 2 shows at the left a ring 3 which is fixed to one end of the body 1, and the starting end of the strip *a* is welded directly to the ring 3 before the winding of the strip is started. FIG. 2 also illustrates one possible example of the cross-sectional configuration or profile of the strip *a*. The strip *a* preferably consists of a metal such as, for example, stainless steel, and before being wound onto the body 1 it is given the profile illustrated in FIG. 2. This profile is such that one side surface of the strip has a longitudinally extending projection 10 while the opposed side surface has a corresponding groove 11. Thus, the projection 10 will mate with the groove 11 so that as the strip is wound the projection 10 at the inner side surface of the strip will be received in the groove 11 at the outer side surface of the previously formed turn of the strip. This tongue-and-groove type of engagement between the successive turns of the wound strip will insure that the covering 2 will not become unwound even if, for one reason or another, the covering strip should suffer a rupture. Moreover, it will be seen that the outer edge region of the strip which is distant from the body 1 is of a lesser thickness than the remainder of the strip. This is brought about by providing the cross section which otherwise would be substantially rectangular with one corner removed therefrom. In this way the outer edge region of the wound strip, because it has a thickness less than the remainder of the strip, will define between the successive turns of the strip an elongated continuous helical groove 9. Thus, it is simple to provide for the groove 9 a shape and size which will achieve the most favorable operation in connection with, for example, the dewatering efficiency of the roll manufactured according to the invention.

FIG. 2 shows in cross section three successive turns of the strip which forms the covering 2, these turns 2a, 2b, and 2c being applied with simultaneous pressure from one or more deforming rollers 7, as described above, so that by means of the action of these rollers an outer longitudinal portion of the strip spaced from the inner roll body 1 becomes elongated while each strip is pressed against the immediately preceding turn as described above.

Of course, the invention is not to be confined to the particular details shown in the drawings and described above. For example, the particular profile of the strip *a* may differ considerably from that which is illustrated.

I claim:

1. In a method of manufacturing, for a paper machine or the like, a roll having a grooved exterior surface, the steps of winding onto an exterior cylindrical surface of an inner roll body an elongated strip which initially is straight and which curves while being wound onto the inner roll body with an inner edge region of the strip engaging the exterior surface of the roll body while an outer edge region of the strip is distant from the roll body and has a thickness less than the thickness of the remainder of the strip so that when the turns of the strip engage each other after winding of the strip onto the inner roll body, a helical groove will be defined between the successive turns of the strip at the outer edge region thereof, and elongating the strip simultaneously with the winding thereof onto the inner roll body at a longitudinal portion of the strip which is spaced outwardly from the exterior surface of the inner roll body which is engaged by the inner region of the strip, for facilitating the curving of the strip while it is wound onto the inner roll body, the elongation of said longitudinal portion of said strip being brought about by pressing the strip at an outer exposed side surface region thereof simultaneously with the winding of the strip onto the inner roll body toward the turns of the strip which have previously been wound onto the inner roll body, with said outer side surface region which is thus pressed being spaced from the exterior surface of the inner roll body and with the pressing being carried out with a force which is sufficient to compress the strip against the previously formed turns thereof while deforming and elongating the strip at said longitudinal portion thereof, said longitudinal portion of the strip being in line with said outer side surface region thereof.

2. In a method as recited in claim 1 and wherein a roller means which includes at least one roller turnable about an axis which extends substantially radially with respect to the axis of said inner roll body is pressed in the direction of the latter axis toward the outer side surface region of the strip and engages the latter for providing said elongation of the strip at said longitudinal portion thereof.

3. In a method as recited in claim 2 and wherein the force with which said roller means is applied against said outer side surface region of said strip is on the order of 400 – 450 kp.

4. In a method as recited in claim 3 and wherein the strip is made of stainless steel.

5. In a method as recited in claim 2 and including the steps of rotating the inner roll body around its axis for pulling the initially straight strip onto the exterior surface of the inner roll body and simultaneously applying a frictional braking force to the initially straight portion of the strip as the latter straight portion travels toward the roll body for providing a tension in the strip simultaneously with the winding thereof onto the roll body and simultaneously with the pressing of the strip at said outer side surface region thereof toward the previously formed turns for elongating said longitudinal portion of the strip.

6. In a method as recited in claim 5 and wherein the braking force is sufficient to provide in the strip a tensile stress on the order of 10 kp/mm$^2$.

7. In a method as recited in claim 6 and wherein the strip is made of stainless steel.

8. In a method as recited in claim 2 and wherein the strip is formed at an outer side surface thereof which includes said outer side surface region with a longitudinal groove and at an opposed inner side surface with a longitudinal projection so that the latter projection of each turn is received in the groove of the previously formed turn, and said outer side surface region of the strip which receives the compressive force for elongating the strip starting at and extending radially outwardly from said groove.

* * * * *